(12) United States Patent
Verhaeghe et al.

(10) Patent No.: US 8,770,102 B2
(45) Date of Patent: Jul. 8, 2014

(54) SQUARE BALER COMPRISING A CONTROL SYSTEM

(75) Inventors: Didier O. M. Verhaeghe, Ypres (BE); Bart M. A. Missotten, Winksele Herent (BE)

(73) Assignee: CNH Industrial America LLC, New Holland, PA (US)

( * ) Notice: Subject to any disclaimer, the term of this patent is extended or adjusted under 35 U.S.C. 154(b) by 191 days.

(21) Appl. No.: 13/498,883

(22) PCT Filed: Sep. 27, 2010

(86) PCT No.: PCT/EP2010/064261
§ 371 (c)(1),
(2), (4) Date: Sep. 14, 2012

(87) PCT Pub. No.: WO2011/039140
PCT Pub. Date: Apr. 7, 2011

(65) Prior Publication Data
US 2013/0008324 A1 Jan. 10, 2013

(30) Foreign Application Priority Data
Sep. 30, 2009 (BE) .................................. 2009/0599

(51) Int. Cl.
*A01F 15/04* (2006.01)
*A01F 15/08* (2006.01)

(52) U.S. Cl.
CPC .................................. *A01F 15/0825* (2013.01)
USPC ............................................... 100/99; 100/43

(58) Field of Classification Search
CPC ..... A01F 15/0825; A01F 15/08; A01F 15/04; B30B 9/3007
USPC ....... 100/43, 45, 50, 51, 99, 100, 188 R, 215, 100/218; 56/10.2 A, 10.2 R, 341; 700/17; 177/145, 199
See application file for complete search history.

(56) References Cited

U.S. PATENT DOCUMENTS

| | | | | |
|---|---|---|---|---|
| 4,316,888 A * | 2/1982 | Nelson | ......................... | 424/602 |
| 5,123,338 A * | 6/1992 | Mathis | ........................... | 100/43 |
| 5,384,436 A * | 1/1995 | Pritchard | ....................... | 177/136 |
| 6,474,228 B1 * | 11/2002 | Leupe et al. | ..................... | 100/45 |
| 6,553,902 B2 * | 4/2003 | Leupe et al. | ..................... | 100/45 |
| 6,786,143 B2 * | 9/2004 | Leupe et al. | ..................... | 100/4 |
| 6,915,736 B2 * | 7/2005 | Leupe et al. | ..................... | 100/45 |
| 2002/0108508 A1 * | 8/2002 | Leupe et al. | ..................... | 100/45 |

FOREIGN PATENT DOCUMENTS

| | | |
|---|---|---|
| EP | 0346586 A2 | 12/1989 |
| EP | 1618780 A1 | 1/2006 |

* cited by examiner

*Primary Examiner* — Jimmy T Nguyen
(74) *Attorney, Agent, or Firm* — Patrick M. Sheldrake

(57) ABSTRACT

The square baler comprises a control system which is operative to determine a desired value for at least one operating parameter based on the inputted operating parameters and the sensor measurements, determine if an operating parameter deviates from its desired value and display to the operator a recommended change to this operating parameter in order to restore this operating parameter to its desired value.

10 Claims, 3 Drawing Sheets

SQUARE BALER COMPRISING A CONTROL SYSTEM

This application is the US National Stage filing of International Application Serial No. PCT/EP2010/064261 filed on Sep. 27, 2010 which claims priority to Belgium Application BE2009/0599 filed Sep. 30, 2009, each of which is incorporated herein by reference in its entirety.

TECHNICAL FIELD

The present invention relates to a control system for an agricultural baler having a control panel for enabling an operator of the baler to set a plurality of operating parameters that affect the baling quality, and a plurality of sensors for determining prevailing values of the operating parameters and of bale quality parameters.

BACKGROUND ART

Balers are machines that pick-up crop that has been deposited in windrows or swathes and compact it into bales. The crop may be, for example, straw that has been deposited by a combine harvester or grass cut by a mowing machine. The balers themselves can be self-propelled or towed by a tractor and the bales can be round or square. The present invention is particularly concerned with square balers but is not restricted to any particular crop.

As with all balers, a square baler has a pick-up mechanism for raising the crop from the ground, a crop transport mechanism and a baling chamber. The transport mechanism in a square baler comprises an intake duct that acts as a pre-baling chamber into which the crop is introduced by the pick-up and in which the crop is pre-compressed by a packer. Alternatively a cutter could be provided at the lower end of the intake duct to chop the crop before it is formed into bales.

When a desired degree of compression has been reached in the intake duct, as detected usually by movement of a spring biased flap in the wall of the intake duct, a so-called stuffer is actuated to upload the contents of the intake duct into a square baling chamber where it is compressed further to form a bale. The bale is built up in slices in this way until the desired bale length is reached.

The compression of the crop in the baling chamber is carried out by a constantly reciprocating plunger which pushes the bale being formed against a resistance offered by a previously formed bale that is in the process of being ejected from the baling chamber. To set its resistance to movement, the previously formed bale is gripped from the sides and/or from above by walls to which a hydraulic pressure is applied in a direction to compress the bale.

The hydraulic pressure that is varied to regulate the density of the bale being formed can be set manually or automatically. In the latter case, instead of manually setting the magnitude of the hydraulic pressure, the operator sets a desired degree of resistance. The actual degree of resistance is measured, for example from the reaction force on the plunger, and compared with the desired resistance to derive an error signal. The hydraulic pressure is then varied in a closed feedback control loop to minimise the error signal and thereby attain the desired resistance set point.

Once a bale in the baling chamber reaches the desires size, lengths of twine are wrapped around the bale and they are knotted to complete the baling process.

Because square balers are well known and well documented in the prior art, it is not believed necessary to describe it in greater detail within the present context.

There are numerous operating parameters that can be set by the operator that affect the baling operation, this term being used herein to refer both the properties of the bales themselves and to the efficiency of the baling operation, for example the weight of crop baled in a given time.

A bale's properties are unacceptable for example if the bale density is too low or too high, or if the bale length or weight is outside a specified range, or if the bale density is not uniform across the width of the bale.

The operating parameters that the operator can set and that affect the baling quality are for example the tractor speed, the steering angle and also machine settings such as the degree of compression in the pre-baling chamber etc. Because of the large number of operating parameters to be set and the fact that the settings are not all independent of one another, it is difficult for an operator, especially one who is inexperienced, to set the values of all the parameters correctly at the same time as driving at the correct speed and in the correct direction.

SUMMARY OF INVENTION

With a view to mitigating the foregoing problem, the present invention provides a square baler comprising:
  a control system comprising a data processor;
  a control panel connected to the control system for enabling an operator of the baler to input a plurality of operating parameters of the baler that affect the baling operation;
  a plurality of sensors connected to the control system for monitoring the baling operation; and
  a display connected to the control system for displaying information to the operator, characterized in that the control system is operative to:
  determine a desired value for at least one operating parameter based on the inputted operating parameters and the sensor measurements;
  subsequently determine if an operating parameter deviates from its desired value;
  subsequently display to the operator a recommended change to this operating parameter in order to restore this operating parameter to its desired value.

One example of an operating parameter that it is desirable to optimise is the load on the plunger generated by the density control system in order to attain a desired bale weight. To help achieve this, it is known for balers to include a weighing apparatus that measures the weight of a bale after it has been formed and before it is discharged onto the ground from the rear end of the baler. The readings from such a weighing apparatus are used to indicate the weight of a given bale and also the total weight of the crop gathered from a field or baled in one day.

Assuming operation with the same machine settings, the weight of any given bale will in practice depend on certain parameters of the crop. The weight not only varies from crop to crop, but also with the moisture content of the crop. Because the moisture content, in particular, is sensitive to weather conditions, even when working on the same day in the same field, variations in bale weight can occur.

There are different operating parameters that have an effect on bale weight. In particular, the hydraulic pressure that varies the load on the plunger, stuffer speed, the density in the intake duct at which a stuffer cycle is triggered and the speed of movement of the baler all have an effect on the weight of the bales being formed.

However, the interaction between these various operating parameters is complicated for reasons that will become clear from the ensuing description and, because of this complexity, it is difficult for an operator, especially one with less experience, to know what to do to restore the bales to their desired weight, when weight measurement indicates that they are too heavy or too light.

In a preferred embodiment of the invention, the square baler comprises at least one sensor to determine the bale weight and the control system is operative to:
- determine that the bale weight differs from a desired weight by an amount exceeding an acceptability threshold,
- subsequently display to the operator a recommended change to at least one operating parameter for restoring the bale weight to the desired value.

The bale weight may be given by the weight of the last completed bale, the average weight of a number of previously completed bales or an estimation of the weight of the bale currently being produced. The average may be an arithmetic mean or a weighted average attaching more significance to recently completed bales.

The acceptability threshold may either be preset, for example to 5% of the desired bale weight, or it may be a predetermined weight set by the operator.

The data processor is connected to a visual display panel of the control system to enable the data processor to convey recommendations visually to the operator and preferably to receive instructions from the operator from the same control panel to implement recommendations automatically when sanctioned by the operator.

Advantageously, the look-up table includes for each crop type default settings of a group operating parameters that for example affect the weight of the formed bales and the data processor is operative to select from the group the operating parameter of which the prevailing setting deviates most from the stored default setting.

The implementation of the recommended correction may suitably act to halve the difference between the prevailing setting and the desired setting of the operating parameter.

The invention is not however limited to the control of bale weight. As a second example, it is important to achieve a desired crop density within the bale and to maintain the density uniform across the width of the bale. As is already known, density measurements can be made in the pre-baling chamber and the control system may display to the operator recommended changes in such operating parameters as the speed, steering angle, packer speed, etc in order to return the density within acceptable limits.

As further examples, the control system of the invention may recommend changes in vehicle speed when the efficiency of the baling operation is too low, or changes in steering angle to distribute the crop more evenly across the width of the pre-baling chamber. In all cases, the baling operation is monitored by sensors to ascertain if the operating parameters lie within an acceptable range and recommendations to operating parameters derived from a look-up table are made to the operator to enable the operating parameters to be maintained within acceptable limits at all times, even when the operator is inexperienced.

The desired settings stored in the look-up table may either be factory settings, or settings chosen by an experienced operator which take into account prevailing ambient factors, such as temperature and humidity. Likewise, the acceptability thresholds may either be factory preset or selected by an experienced operator. In this way, the invention allows an experienced operator to set the baler for optimum operation and then to leave the baler in the hands of a less experienced operator. When an alarm condition occurs, the less experienced operator will be supported by the on-board data processor as to what corrections are needed to rectify the sensed problem.

In the preferred embodiment of the invention, the screen warning of non-optimal performance will also mention a recommended action displayed on the screen. The operator may then opt to implement the recommendation or disregard it.

BRIEF DESCRIPTION OF DRAWINGS

The invention will now be described further, by way of example, with reference to the accompanying FIGS. 1-3 showing a typical visual display serving as the operator interface in a baler.

DESCRIPTION OF EMBODIMENTS

Figure 1:
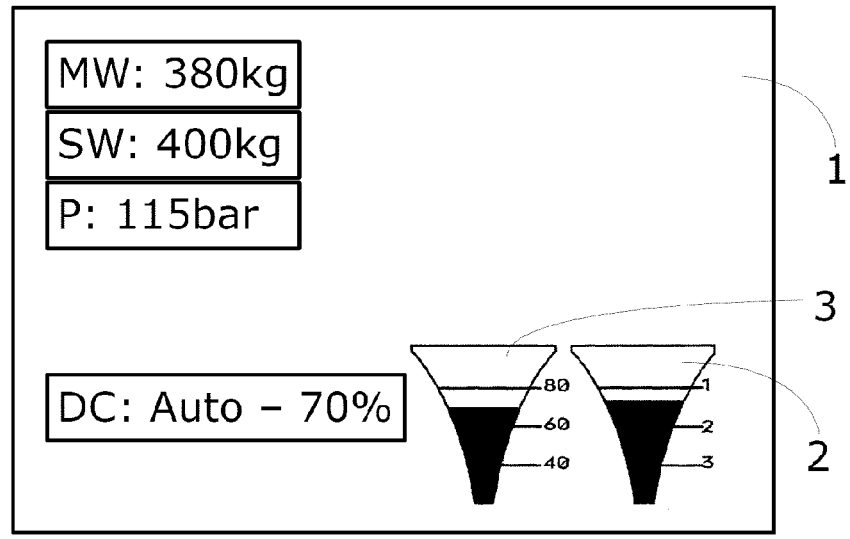

The visual display 1 shown in the drawings shows the operating parameters that are typically indicated to the operator. These operating parameters are for example the baler speed, the load on the plunger 3, hydraulic pressure of the compression system P and the capacity of the intake duct 2. The display also indicates the weight of the last weighed bale MW. It is also possible to display for example the cumulative total weight of crop that has been baled. The cumulative total can be reset at the commencement of a day or a job.

An expert operator will know from past experience how to set the various operating parameters to control the baling operation, for example to optimise the efficiency of the baler (measured by the weight of crop baled in a given time) or to achieve a desired bale weight. However, because control of the various operating parameters is not intuitive, for reasons that will be explained below, their setting can confuse an inexperienced operator.

An increase in the plunger load will clearly increase packing density and therefore increase bale weight. It is however not as simple to predict the effect of varying the crop density in the intake duct at which the sensor in the intake duct will initiate a stuffer cycle. The reason for this is that the uploading of slices into the square baling chamber cannot be carried out at will but must be synchronised with the movement of the reciprocating plunger.

The plunger in the baling chamber is in constant reciprocating motion. During each forward stroke, the plunger pushes crop present in the baling chamber towards the discharge end and, during its return stroke, it separates from the crop leaving space for a new slice to be uploaded from the intake duct by the stuffer. If the stuffer attempts to upload a slice while the plunger is not near its bottom dead centre at the end of a return stroke then the entrance to the square baling chamber will be obstructed either by the crop or by the plunger.

Thus, when the crop in the intake duct reaches the density required to initiate a stuffer cycle, that cycle is not commenced immediately but it is timed to ensure that the slice is transferred into the baling chamber when the plunger is next near its bottom dead centre position. Consequently, the pickup mechanism continues to increase the crop density in the intake duct while waiting for the plunger to reach the appropriate position in its cycle, resulting in the density of the slice uploaded into the baling chamber being greater than the density set by the operator.

In practice, the plunger in the baling chamber may perform more than one cycle while the desired mass of crop is being accumulated in the intake duct. The intake duct capacity referred to above and displayed to the operator is measured in terms of the number of cycles of the plunger required for the density in the intake duct to reach the value at which the associated sensor initiates a stuffer cycle.

The intake duct capacity need not be a whole number of plunger cycles. Ideally, the time taken to achieve the crop density level chosen to initiate a stuffer cycle should be slightly less than a whole number multiple of the plunger cycle. In this way, after having been tripped, the stuffer does not have to wait long for the plunger to reach a suitable position in the baling chamber to permit the uploading of the slice to be commenced. If the tripping is not well timed, it may be necessary for the stuffer to wait for nearly a whole cycle of the plunger to be completed before uploading can be commenced.

From this explanation, it will be clear that the pressure setting of the sensor 15 in the intake duct at which a stuffer cycle is tripped does not linearly correlate with the density of the formed bales. Because the plunger oscillates with a constant frequency, it will also be clear that the speed of the baler has to be matched to the setting of the pressure sensor in the intake duct for the stuffer cycles to be correctly synchronised with plunger cycles.

The estimation of bale weight is complicated further by the fact that the degree to which a slice is compressed by the plunger in the baling chamber varies with the thickness of the slice, the plunger being more successful at compressing thinner slices than thicker ones. An increase in the mass of each slice does not therefore result in an increase in a bale of sufficient density, more probably it will result in a bale of reduced density and poorer shape. The quantized uploading of crop into the baling chamber in this way affects the accuracy to which the weight of any given bale can be set.

It is because of this unavoidable variation in bale weight that one should not rely on the weight of the last formed bale but one should develop a statistically significant average before changing any of the controls that affect bale weight.

The aim of the present invention is to provide recommendations to the operator to assist in reaching the most appropriate operating parameter settings for the prevailing operating conditions. The system of the invention does not assume overall control of the baler and recommendations of the control system are only implemented after they have been sanctioned by the operator.

The square baler 10 of the present invention comprises a control system 4 that comprises a data processor that receives input signals from for example a baler speed sensor, a bale weighing mechanism 12, and a load cell measuring the reaction force on the plunger and hydraulic pressure of the compression system, friction measurement, IR density sensors, moisture or crop-content, inclination, direction, etc. The data processor also receives a signal indicative of the prevailing intake duct capacity as described above. The data processor is thus capable of determining if the measured bale weight deviates from the desired bale weight by more than a preset factor. When this occurs, the data processor signals to the operator that the bale weight is not within the limits of acceptability and recommends to the operator an action to correct the situation.

The manner in which the data processor arrives at a recommendation is not fundamental to the present invention. It may simply rely on values derived from a look-up table in which the stored values have been determined empirically or it may employ a mathematical algorithm that generates suitable settings for the various parameters. As a further possibility, the data processor may employ a so-called expert system which basically learns to avoid past mistakes.

When a group of desired values for operating parameter settings is determined by the data processor, the desired values are compared with the actual setting and a recommendation is given to the operator to change the operating parameter that differs most from the desired value. Preferably, the data processor recommends that this operating parameter be changed to a value halving the difference between its current setting and the desired value determined by the data processor.

While the invention has been described above by specific reference to optimising bale weight, it has more general application to any operating parameter that affects the baling operation. More generally, the square baler can be considered as comprising three main components, namely the sensors, the control system and the operating parameters of the control system that are set by the operator to control the baling operation, for example by means of actuators.

Various sensors available for monitoring the baling operation are already known and include sensors for measuring the following:
 Load plunger reaction force
 Baler speed (measured in revolutions per minute)
 Crop type and moisture content
 Bale length
 Slice thickness
 Hydraulic pressure applied to the walls of the baler
 Bale weight (12)
 Crop friction
 Relative crop density in the intake duct (15)
 Trip sensitivity setting of stuffer The control system 4 comprises a data processor that may be programmed to optimise different operating parameters depending on the circumstances. As it may not be possible to optimise all the parameters at the same time, for example increased efficiency may result in poorer bale quality, the programming may also determine a suitable compromise so that all operating parameters are maintained within an acceptable range while only one is optimised.

Amongst the operating parameters that the control system may endeavour to optimise are:
 Bale weight and size
 Capacity index
 Slice density
 Bale shape and density
 Uniformity of bale density As has been mentioned above, the control system relies on the operator to modify the settings of the operating parameters that affect the performance of the baler and only makes recommendations for the operator to implement. Such recommendations are made via a visual display 1, such as shown in FIG. 1, which may display the prevailing values of the parameters to be optimised as well as the recommended change to an operating parameter setting to maintain the various operating parameters within an acceptable range.

Thus the display 1 may indicate prevailing values of a set target weight SW, measured weight MW, bale length, capacity of the intake duct 2, measured load on the plunger 3, a load setpoint for the density control system DC, hydraulic pressure P, trip sensitivity etc and provide recommendations for changing such operating parameters as speed, steering direction and hydraulic pressure, load setpoint which can be dynamically changed by the operator. The display may also provide recommendations for the operator to change certain settings manually, such as the trip sensitivity of the stuffer, intake settings such as the position of the wind guard, the number of knives in the crop cutter etc.

Figure 2:
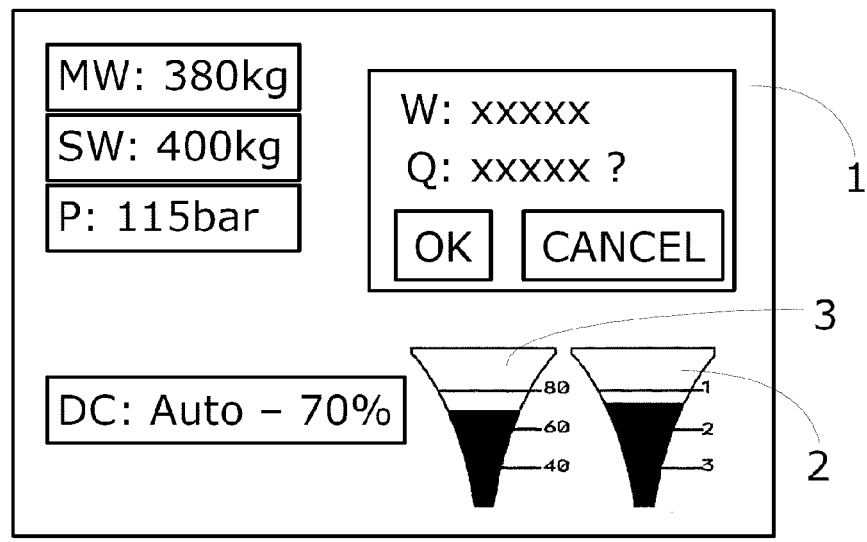
Figure 3:
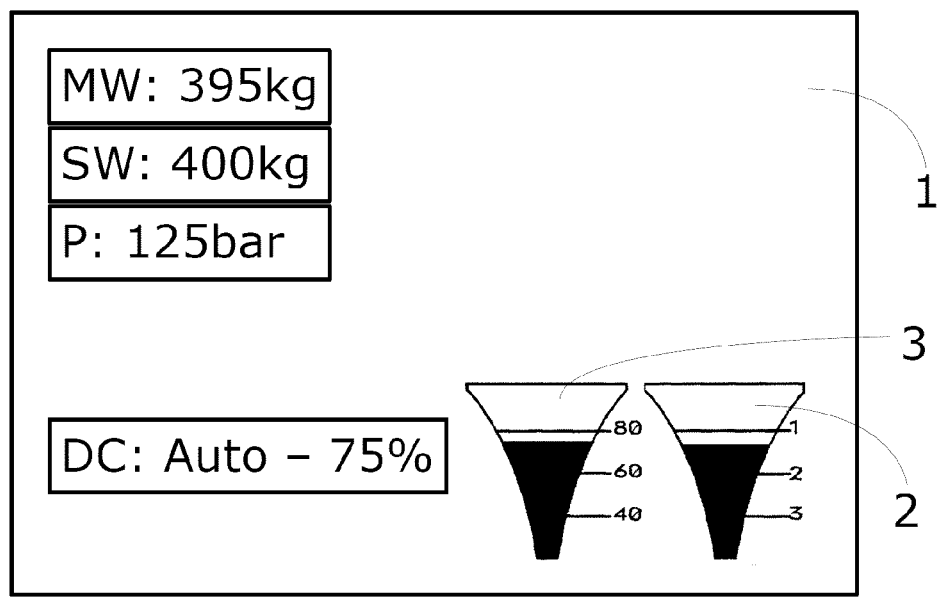
Figure 4:
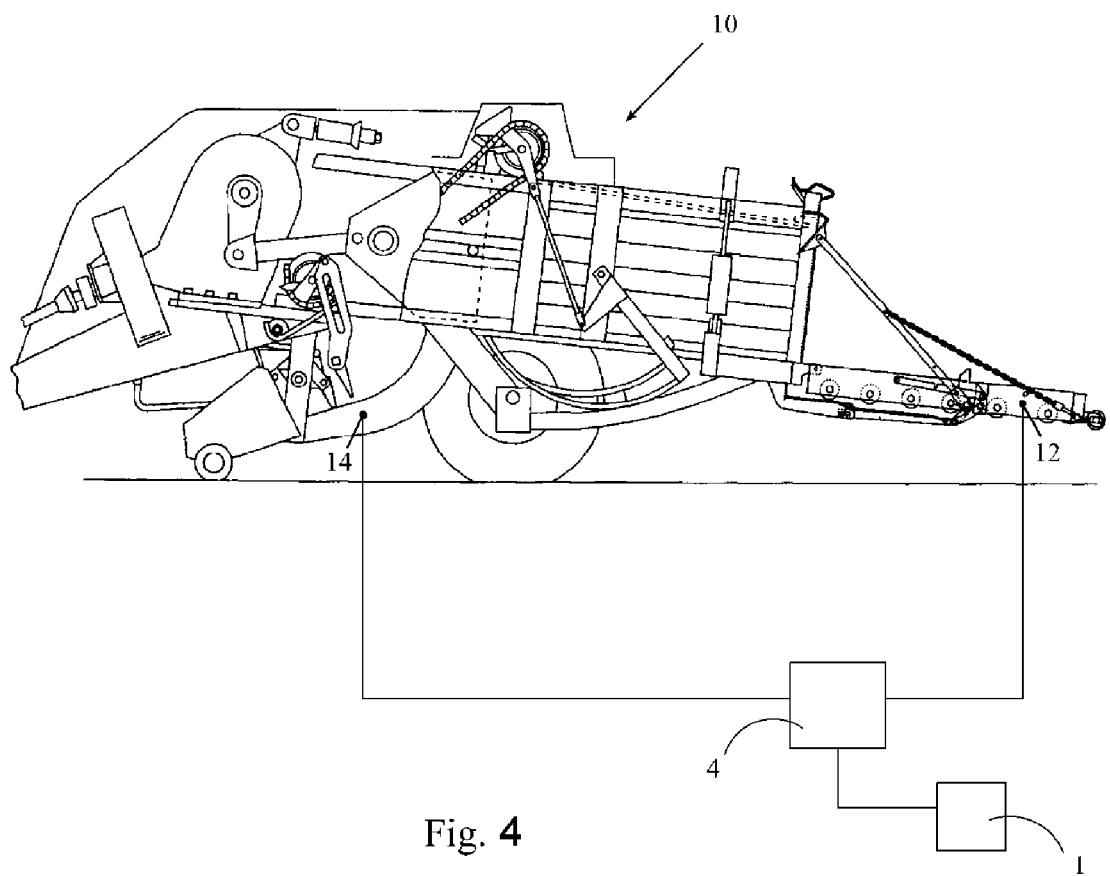
FIG. 4 shows a baler and associate control system.

According to the embodiment of the invention shown in FIG. 1, the operator has inputted to the control system a setpoint for the weight of a bale SW to be 400 kg. The operator also inputted a setpoint for the density control system DC to generate a load of 70%. The example described is for example for straw bales that are 2.40 m long, 1.20 m in width and 0.90 m high. As can be seen in FIG. 1 the measured load on the plunger 3 which is displayed is about 70%, but the measured weight MW, which is for example the average weight of the last ten bales, is displayed as being 380 kg. The control system of the baler could be programmed for example to react to a situation in which the measured weight and the target weight differ by more than 10 kg. As this is the case the control system could be programmed to calculate according to a suitable algorithm or look up in a look-up table a desired value for the load setpoint for the density control system DC in function of the target weight SW and optionally the measured load on the plunger 3. The control system determines for example that this desired value should be 80%. As the load setpoint for the density control system DC deviates from this desired value the control system will display to the operator a recommended change to this operating parameter as shown in FIG. 2. This recommended change could be for example to halve the difference between the current value and the desired value for the setpoint of the density control system DC. A warning message W is displayed on the display 1 that states for example: "Bale weight deviates from setpoint by more than 10 kg.". Further also a question Q is displayed on the display 1 to propose the recommended change to the load setpoint for the density control system DC: "Do you want to increase the load setpoint to 75%?". This recommended change will only be implemented after it has been sanctioned by the operator using the OK button to confirm the change or the CANCEL button to discard the change. If the operator presses the OK button the change will be implemented and the setpoint for the density control system DC will be changed to the desired value of 75%, as for example displayed in FIG. 3. Also visible in FIG. 3 is that, after the measured load on the plunger 3 has raised to 75%, the measured weight MW subsequently also has raised to 395 kg and thus approached the target weight SW to within acceptable limits.

It is clear that instead of a fixed value of for example 10 kg for the difference between the target weight SW and the measured weight MW, it is also possible to choose a certain percentage, for example 5% of the target weight SW as a threshold for the control system to react.

In another situation for example the target weight SW is 400 kg, the measured weight MW is 380 kg, the driving speed is 9 km/h, the measured load on the plunger is 100%, the intake duct capacity 2 is 1.9 and the trip sensitivity of the stuffer is about 50%. In this case the control system could advise the operator to increase the trip sensitivity of the stuffer by a certain amount to attain an intake duct capacity of 0.9 which would lead to an increased weight of the bales. Alternatively the control system could advise to decrease the driving speed with a certain amount to for example 7 km/h which would equally lead to an increased weight of the bales.

In another situation if the intake duct capacity 2 doesn't approach a desired unitary value, such as 1.0, 2.0 or 3.0, but for example 0.5 or 1.5, the control system could advise the operator to adapt the driving speed and/or to change the trip sensitivity of the stuffer.

In another situation if it is detected that the length of the slices forming the bales differs from a desired value of for example 12 cm, the control system could advise the operator to adapt the driving speed and/or to change the trip sensitivity of the stuffer.

In still another situation if it is detected that the density of the bale doesn't meet the desired uniformity, the control system could advise the operator to compensate this by adjusting his steering behaviour our driving pattern, by for example driving somewhat to the left or the right. Alternatively it could be advised to compensate a predetermined GPS routing that is followed by the baler.

The square baler according to the invention as defined in the claims is of course not limited to the exemplary embodiments as described and shown in the drawings, but can equally comprise combinations and variations that fall within the scope of the claims.

What is claimed is:

1. A square baler comprising:
   a control system comprising a data processor;
   a control panel connected to the control system for enabling an operator of the baler to input a plurality of operating parameters of the baler that affect the baling operation;
   a plurality of sensors connected to the control system for monitoring the baling operation;
   display connected to the control system for displaying information to the operator; and
   the control system is programmed to determine a desired value for at least one operating parameter based on the inputted operating parameters and the sensor measurements,
   determine if an operating parameter deviates from its desired value and display to the operator a recommended change to this operating parameter in order to restore this operating parameter to its desired value.

2. A square baler according to claim 1, wherein the control system is operative to determine a plurality of desired values for operating parameters, determine which operating parameter deviates most from its desired value and display to the operator a recommended change to this operating parameter.

3. A square baler according to claim 2, wherein the control system is operative to display to the operator a recommended change for the operating parameter that acts to halve the difference between its current value and its desired value.

4. A square baler according to claim 1, the square baler comprises at least one sensor to determine the bale weight and the control system is programmed to determine that the bale weight differs from a desired weight by an amount exceeding an acceptability threshold and display to the operator a recommended change to at least one operating parameter for restoring the bale weight to the desired value.

5. A square baler according to claim 4, wherein the bale weight is determined by the weight of the last completed bale, the average weight of a number of previously completed bales or an estimation of the weight of the bale currently being produced.

6. A square baler according to claim 4, wherein the acceptability threshold is a predetermined fraction of the desired bale weight.

7. A square baler according to claim 4, wherein the acceptability threshold is a predetermined weight set by the operator.

8. A square baler according to claim 1, wherein the square baler comprises at least one sensor to determine the density of the bales and the control system is programmed to
   determine that the bale density differs from a desired density by an amount exceeding an acceptability threshold and display to the operator a recommended change in such operating parameters as the speed or steering angle for restoring the bale density or its uniformity to the desired value.

9. A square baler according to claim 8, wherein the control system is programmed to display to the operator recommended changes in steering angle to distribute the crop more evenly across the width of the pre-baling chamber for restoring the uniformity of the bale density to the desired value.

10. A square baler according to claim 1, wherein the control system is operative to receive instructions from the operator to implement recommended changes to the operating parameter when sanctioned by the operator.

\* \* \* \* \*